United States Patent [19]
Valencia et al.

[11] Patent Number: 5,968,473
[45] Date of Patent: Oct. 19, 1999

[54] STANNOSILICATE MOLECULAR SIEVES

[75] Inventors: Susana Valencia Valencia; Avelino Corma Canós, both of Valencia, Spain

[73] Assignee: UOP LLC, Des Plaines, Ill.

[21] Appl. No.: 09/215,815

[22] Filed: Dec. 18, 1998

[51] Int. Cl.⁶ .............................. C01B 33/20; C01B 39/08
[52] U.S. Cl. ...................... 423/702; 423/705; 423/706; 423/713; 423/326; 423/DIG. 27; 502/60; 502/64; 502/242
[58] Field of Search ...................................... 423/701, 702, 423/705, 706, DIG. 27, 713, 326; 502/242, 60, 64

[56] References Cited

U.S. PATENT DOCUMENTS

| | | | |
|---|---|---|---|
| Re. 28,341 | 2/1975 | Wadlinger et al. | 208/120 |
| 4,329,328 | 5/1982 | McAnespie et al. | 423/332 |
| 4,543,347 | 9/1985 | Heyward et al. | 502/61 |
| 4,576,805 | 3/1986 | Chang et al. | 423/DIG. 27 |
| 4,933,161 | 6/1990 | Vaughan et al. | 423/713 |
| 5,110,571 | 5/1992 | Corcoran, Jr. | 423/713 |
| 5,399,336 | 3/1995 | Guth et al. | 423/713 |
| 5,401,488 | 3/1995 | Skeels et al. | 423/715 |
| 5,554,356 | 9/1996 | Saxton et al. | 423/706 |
| 5,648,558 | 7/1997 | Hatano et al. | 568/618 |

FOREIGN PATENT DOCUMENTS

| | | |
|---|---|---|
| 2037596 | 6/1993 | Spain. |
| 88/01254 | 2/1988 | WIPO. |
| 97/33830 | 9/1997 | WIPO. |

*Primary Examiner*—Mark L. Bell
*Assistant Examiner*—David Sample
*Attorney, Agent, or Firm*—Thomas K. Mcbride; Frank S. Molinaro

[57] ABSTRACT

A new family of stannosilicate molecular sieves which have the zeolite beta structure are disclosed. These molecular sieves have a three dimensional framework structure composed of at least $SnO_2$ and $SiO_2$ tetrahedral oxide units (and optionally $TiO_2$ and $GeO_2$ units) and have an empirical formula of:

$$(Sn_xTi_ySi_{1-x-y-z}Ge_z)O_2$$

where "x", "y" and "z" are the mole fractions of tin, titanium and germanium respectively. A process for preparing these molecular sieves is also presented along with processes for the selective oxidation of organic compounds with peroxides using the molecular sieves as catalysts.

14 Claims, No Drawings

STANNOSILICATE MOLECULAR SIEVES

FIELD OF THE INVENTION

This invention relates to molecular sieves which have the zeolite beta structure. The molecular sieves have at least $SnO_2$ and $SiO_2$ tetrahedral oxide units and have an empirical formula of:

$$(Sn_xTi_ySi_{1-x-y-z}Ge_z)O_2$$

Titanium and germanium are optional elements. The invention also relates to a process for preparing the molecular sieves and processes for using the sieves.

BACKGROUND OF THE INVENTION

Zeolites are crystalline aluminosilicate molecular sieves which have a microporous three-dimensional framework structure. In general, the crystalline zeolites are formed from corner-sharing $AlO_2$ and $SiO_2$ tetrahedra and are characterized by having pore openings of uniform dimensions, having a significant ion-exchange capacity, and being capable of reversibly desorbing an adsorbed phase which is dispersed throughout the internal voids of the crystal, without significantly displacing any atoms which make up the permanent crystal structure.

Zeolite beta, which is described in U.S. Pat. No. RE 28,341 and is incorporated by reference, is one particular zeolite which has recently received considerable attention for catalyzing various types of reactions. Zeolite beta is usually synthesized in a basic medium in the presence of tetraethylammonium and alkali cations and has a Si/Al mole ratio from about 5 to about 100. A molecular sieve with the zeolite beta structure but containing titanium in the framework is described in Spanish patent no. 2,037,596 which also discloses that the titanium containing material can be used as a catalyst in selective oxidation reactions of organic compounds using hydrogen peroxide, organic peroxides or hydroperoxides as the oxidizing agent.

WO97/33830 discloses the synthesis of zeolite beta using fluoride anions as the mineralizing agent at or near neutral pH. It is disclosed that these materials exhibit enhanced thermal stability and low concentration of SiO or SiOH defects over a wide chemical composition range. Finally, T. Blasco et al. in *J. Phys. Chem. B,* 1998, 102, p. 75 disclose the incorporation of titanium into the beta structure by using the procedure in WO97/33830 again over a wide Si/Al range. These materials also have increased hydrophobicity.

In contrast to this, applicants have synthesized a series of molecular sieves comprised of at least $SnO_2$ and $SiO_2$ tetrahedral units. Titanium and germanium can also be present in the framework. These molecular sieves are represented by the empirical formula:

$$(Sn_xTi_ySi_{1-x-y-z}Ge_z)O_2$$

where "x", "y" and "z" are the mole fractions of tin, titanium and germanium. These stannosilicate molecular sieves are useful as catalysts in selective oxidation processes such as olefin epoxidation and hydroxylation of aromatic compounds.

SUMMARY OF THE INVENTION

The present invention relates to a new series of crystalline stannosilicate molecular sieves, a process for preparing them and a process using them. Accordingly, one embodiment of the invention is a crystalline stannosilicate molecular sieve having a microporous three dimensional structure containing at least $SiO_2$ tetrahedral and $SnO_2$ tetrahedral units, a crystallographically regular pore system, and an empirical formula on a calcined and anhydrous basis of:

$$(Sn_xTi_ySi_{1-x-y-z}Ge_z)O_2$$

where "x" is the mole fraction of tin and varies from about 0.001 to about 0.1, "y" is the mole fraction of titanium and varies from zero to about 0.1 and "z" is the mole fraction of germanium and varies from zero to less than about 0.08 and characterized in that the composition has the characteristic x-ray diffraction pattern of zeolite beta.

Another embodiment of the invention is a process for preparing the molecular sieves described above. The process comprises forming a reaction mixture containing reactive sources of silicon, tin, an organic templating agent (R), optionally titanium, optionally germanium, fluoride and optionally hydrogen peroxide, reacting said mixture at a pH of about 6 to about 12 and at a temperature and a time sufficient to form the crystalline molecular sieve, the mixture having a composition expressed in terms of mole ratios of $$SiO_2:aR_2O:bSnO_2:cGeO_2:dTiO_2:eF:fH_2O_2:gH_2O$$

where "a" has a value from about 0.06 to about 0.5, "b" has a value from about 0.001 to about 0.1, "c" has a value from zero to about 0.08, "d" has a value from 0 to about 0.1, "e" has a value from about 0.1 to about 2, "f" has a value from zero to about 0.5 and "g" has a value from about 4 to about 50.

A further embodiment is a process for the selective oxidation of organic compounds comprising reacting an organic compound with a peroxide in the presence of a catalyst under oxidation conditions to give an oxidized product, the catalyst comprising the molecular sieves described above.

These and other objects and embodiments will become more apparent after a detailed description of the invention.

DETAILED DESCRIPTION OF THE INVENTION

The crystalline molecular sieves of the present invention have a microporous three dimensional framework structure containing at least $SiO_2$ and $SnO_2$ tetrahedral units, a crystallographically regular pore system and an empirical formula on a calcined and anhydrous basis of:

$$(Sn_xTi_ySi_{1-x-y-z}Ge_z)O_2$$

where "x" is the mole fraction of tin and varies from about 0.001 to about 0.1, "y" is the mole fraction of titanium and varies from zero to about 0.1 and "z" is the mole fraction of germanium and varies from zero to less than about 0.08. Finally, the molecular sieves have the structure of zeolite beta.

These molecular sieves are prepared using a hydrothermal crystallization process in which a reaction mixture prepared by combining reactive sources of tin, silicon, an organic templating agent, optionally germanium, optionally titanium, a fluoride source, optionally hydrogen peroxide and water. The sources of silicon include but are not limited to colloidal silica, amorphous silica, fumed silica, silica gel and tetraalkylorthosilicate. Sources of tin include but are not limited to tin halides, tin alkoxides, tin oxide, metallic tin, alkaline and alkaline earth stannates and alkyl tin compounds. A preferred source is tin tetrachloride. Examples of tin alkoxides include tin butoxide, tin ethoxide and tin propoxide. The organic templating agents include tetraalkylammonium ions such as tetraethylammonium ions, azapolycyclic compounds such as 1,4-diazabicyclo 2,2,2, octane; dialkyldibenzylammonium ions such as dimethylbenzyl ammonium ion and bis-piperidinium ions such as 4,4'trimethylene bis (N-benzyl N-methyl piperidinium) ion. These ions may be added as the hydroxide or halide compounds. Germanium sources include germanium halides, germanium alkoxides and germanium oxide. Finally, titanium sources include titanium alkoxides and titanium halides. Preferred titanium alkoxides are titanium tetraethoxide, titanium isopropoxide and titanium tetrabutoxide.

The reaction mixture will also contain a fluoride source such as hydrofluoric acid or ammonium fluoride, and optionally hydrogen peroxide plus water.

Generally, the hydrothermal process used to prepare the stannosilicate molecular sieves involves forming a reaction mixture, using the sources stated above, which is expressed by the formula:

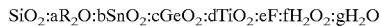

$$SiO_2:aR_2O:bSnO_2:cGeO_2:dTiO_2:eF:fH_2O_2:gH_2O$$

where "a" has a value from about 0.06 to about 0.5, "b" has a value from about 0.001 to about 0.1, "c" has a value from zero to about 0.08, "d" has a value from 0 to about 0.1, "e" has a value from about 0.1 to about 2, "f" has a value from zero to about 0.5 and "g" has a value from about 4 to about 50. The reaction mixture is prepared by mixing the desired sources of tin, silicon, optionally titanium, optionally germanium, an organic templating agent, water, optionally hydrogen peroxide and a fluoride source in any order to give the desired mixture. It is also necessary that the pH of the mixture be in the range of about 6 to about 12 and preferably in the range of about 7.5 to about 9.5. If necessary the pH of the mixture can be adjusted by adding HF and/or $NH_4F$. Hydrogen peroxide may be added in order to form a complex with titanium and maintain it in solution.

Having formed the reaction mixture, it is next reacted at a temperature of about 90° C. to about 200° C. and preferably 120° C. to about 180° C. for time of about 2 days to about 50 days and preferably from about 10 days to about 25 days in a sealed reaction vessel under autogenous pressure. After the allotted time, the mixture is filtered to isolate the solid product which is washed with deionized water and dried in air.

In order to promote crystallization, it is preferred to add zeolite beta crystals as seeds to the reaction mixture. These crystals can be added as a dry solid, a suspension in an appropriate liquid, e.g., water, alcohol or a preorganized gel, i.e., a gel which contains nuclei. A preferred zeolite beta seed is one prepared according to the teachings of Spanish Patent Application No. P9501552.

The isolated molecular sieve is characterized in that it has the x-ray diffraction pattern characteristic of zeolite beta which includes at least the peaks and intensities presented in Table A. The intensity presented in Table A is a relative intensity which is obtained by relating the intensity of each peak (I) to the strongest line ($I_0$). The intensity is given by the equation $100 \times I/I_0$ and are represented by vs, s, m and w, where these are defined as: vs=80–100; s=60–80; m=15–60 and w=0–15.

TABLE A

| 2 Θ | d (Å) | Relative Intensity |
|---|---|---|
| 7.22 | 12.23 | m |
| 7.76 | 11.38 | s |
| 21.54 | 4.12 | m |
| 22.57 | 3.94 | vs |
| 22.96 | 3.87 | w |
| 25.45 | 3.50 | w |
| 27.00 | 3.30 | w |
| 29.00 | 3.08 | w |
| 29.65 | 3.01 | m |
| 30.60 | 2.92 | w |

As synthesized, the molecular sieves of this invention will contain some of the organic templating agent and fluoride ions in the pores of the sieve. In order to activate the zeolite, i.e., active for adsorption or catalytic reactions, it is necessary to remove the organic template and fluoride. This is generally accomplished by calcining the molecular sieve at a temperature of about 300° C. to about 1000° C. for a time sufficient to remove substantially all the organic template and fluoride which usually is about 1 to about 10 hrs.

The calcined molecular sieves of this invention are particularly useful in catalyzing various selective oxidation reactions of organic compounds with hydrogen peroxide, organic peroxides or hydroperoxides. These selective oxidation reactions include: oxidation of alkanes to alcohols or ketones; oxidation of alcohols to ketones; hydroxylation of aromatic compounds; epoxidation of olefins and; oxidation of thioethers to sulfoxides or sulphones. The above reactions can be carried out by processes known in the art. Of the above peroxides, hydrogen peroxide is preferred and especially an aqueous solution. The weight percent of hydrogen peroxide in water can vary considerably from about 2 wt. % to about 70 wt. % and preferably from about 20 wt. % to about 50 wt. %.

These processes can be carried out at temperatures of about 20° C. to about 90° C. and preferably from about 30° C. to about 80° C. Although atmospheric pressure is sufficient to carry out these processes, elevated pressures may be desirable or preferable to increase the solubility of gaseous reactants in the reaction medium. The reaction medium or cosolvent can be selected from the group consisting of methanol, water, acetonitrile, isopropanol, acetone, and ethanol.

Any of the above processes can be carried out either in a batch or continuous mode. In a batch mode the organic reactant either alone or in a solvent is mixed with hydrogen peroxide in the presence of an effective amount of catalyst. Generally, the weight percent of catalyst to organic compound can vary from about 0.5 wt. % to about 50 wt. %. The contacting is carried out for an effective time which usually is from about 0.2 to about 24 hours.

If the process is conducted in a continuous mode, any one of the well known process techniques can be used. These include a fixed bed process, a continuous stirred tank process, a radial bed process, etc. In such processes it is advantageous, in order to minimize back pressure, to use the catalyst in particulate form such as pellets, extrudates, spheres, irregularly shaped particles, etc. The molecular sieve can be formed into these shapes, either with or without a binder. If binders are used, any of the well known binders such as silica, alumina, silica-alumina, clays, etc. can be used.

Finally, the molar ratio of organic compound to peroxide can vary substantially from about 20:1 to about 0.7:1.

In order to more fully illustrate the invention, the following examples are set forth. It is to be understood that the examples are only by way of illustration and are not intended as an undue limitation on the broad scope of the invention as set forth in the appended claims.

EXAMPLE 1

This example illustrates the preparation of zeolite beta seeds according to Spanish patent application no. P9501552.

In a container there were dissolved 1.85 grams of $AlCl_3 \cdot 6H_2O$ in 4.33 gram of water. To this solution 45.24 grams of tetraethylammonium hydroxide (TEAOH) (35% by weight aqueous solution) were added. Next, 40 grams of tetraethylorthosilicate (TEOS) were added and the mixture was stirred until the ethanol formed by the hydrolysis of TEOS was evaporated. The final composition of the gel was as follows:

$$SiO_2:0.28TEA_2O:0.02Al_2O_3:6.5H_2O$$

The solution which was obtained was transferred to a Teflon® lined stainless steel autoclave, heated to 140° C., with stirring and reacted for 3 days. The product was recovered by centrifugation, washed with distilled water and dried at 100° C. The product was found to have the structure of zeolite beta with a crystallinity of about 90%.

The zeolite beta sample of the previous paragraph was dealuminated by treating 1 gram of the as-synthesized zeolite with 60 grams of $HNO_3$ (60 wt. %) at 80° C. for 24 hours. The solid was recovered by filtration, washed with distilled water and dried at 100° C. The crystallinity of this product zeolite was found to be 70% and the Si/Al ratio was determined by chemical analysis to be higher than 2,000.

EXAMPLE 2

This example illustrates the synthesis of a stannosilicate with the zeolite beta structure.

In a container there were mixed 30 grams of TEOS and 32.99 grams of TEAOH (35 wt. %). After 90 minutes, a solution of 0.43 grams of $SnCl_4 \cdot 5H_2O$ (98%) in 2.75 grams of water was added and the mixture stirred until the ethanol formed by the hydrolysis of the TEOS was evaporated. To the clear solution there were added 3.2 grams of HF (48 wt. %) and a thick paste was obtained. Finally, a suspension of 0.36 grams of dealuminated zeolite beta seeds prepared as in Example 1 in 1.75 gram of water were added. The final composition of the gel is given by the following formula:

$$SiO_2:0.27TEA_2O:0.008SnO_2:0.54HF:7.5H_2O$$

The paste was loaded in a Teflon®-lined stainless steel autoclave and heated to 140° C. and reacted for 11 days with stirring. After 11 days, the product was recovered by filtration and was shown by x-ray diffraction analysis to have the structure of zeolite beta and to have a crystallinity of about 95%. Chemical analysis further showed that the product contained 1.62 wt. % tin. The product was calcined at 580° C. for 3 hours and maintained its crystallinity. The empirical formula of the material on a calcined and anhydrous basis was found to be:

$$(Si_{0.992}Sn_{0.008})O_2.$$

EXAMPLE 3

This example illustrates the synthesis of a stannotitanosilicate with the zeolite beta structure. In a container, 45 grams of TEOS and 0.41 grams of titaniumtetraethoxide were added and to this solution there were added 49.89 grams of TEAOH and 7.04 grams of hydrogen peroxide (35 wt. %). After 90 minutes, a solution of 0.64 grams of $SnCl_4 \cdot 5H_2O$ in two grams of water were added and the mixture stirred until the ethanol formed from the hydrolysis of TEOS was evaporated. To this solution there were added 4.94 grams of HF (48 wt. %) and a thick paste was obtained. Finally, a suspension of 0.55 grams of dealuminated zeolite beta seeds (prepared as in Example 1) in 2.5 grams of water were added. The final composition of the gel is described by the following formula.

$$SiO_2:0.27TEA_2O:0.008SnO_2:0.008TiO_2:0.54HF:\\0.33H_2O_2:7.5H_2O$$

The paste was loaded into a Teflon®-lined stainless steel autoclave and heated to 140° C. for 20 days with stirring. After this time, the product was recovered by filtration to give a product which contained silicon, tin and titanium in the framework and had the x-ray diffraction pattern of zeolite beta. The crystallinity of the product as measured from its x-ray diffraction pattern was about 95%. A portion of this sample was analyzed and showed that it contained 1.72 wt. % tin and 0.25 wt. % titanium. After calcination at 580° C. the stannotitanosilicate molecular sieve maintained its crystallinity. The empirical formula of the product on a calcined and anhydrous basis was determined to be:

$$(Si_{0.988}Sn_{0.009}Ti_{0.003})O_2.$$

EXAMPLE 4

This example illustrates the synthesis of Sn, Ge, Ti-containing zeolite Beta.

In a container 30 g of tetraethylorthosilicate (TEOS) and 0.27 g of $Ti(OEt)_4$ were hydrolyzed with stirring at 25° C. in a solution containing 33.26 g of tetraethylammonium hydroxide (TEAOH) (35 wt. %) and 4.69 g of $H_2O_2$ (35 wt. %). was added. After 30 minutes, 0.13 g of $GeO_2$ were added and the solution was stirred at 25° C. until the ethanol formed in the hydrolysis of TEOS was evaporated. To the yellow clear solution there were added 3.29 g of HF (48 wt %.) and a yellow thick paste was obtained. Finally, a suspension of 0.38 g of dealuminated zeolite Beta seeds in 2 g of water was added. The final composition of the gel was as follows:

$$SiO_2:0.27TEA_2O:0.008SnO_2:0.008GeO_2:0.008TiO_2:\\0.54HF:0.33H_2O_2:7.5H_2O$$

This paste was loaded into a Teflon-lined stainless steel autoclave and heated at 140° C. under rotation (60 rpm) for 15 days.

The product obtained after the crystallization was filtered, washed with distilled water and dried at 100° C. to yield the Sn, Ge, Ti-Beta sample. The product exhibited the X-ray diffraction pattern of zeolite beta of about 100% crystallinity. Chemical analysis showed that the material contained 1.65 wt. % Sn, 0.5 wt. % Ti and 1 wt. % Ge. The solid was calcined at 580° C. for 3 hours and maintained its crystallinity.

The empirical formula of the material on a calcined and anhydrous basis was calculated to be:

$$(Si_{0.979}Sn_{0.009}Ge_{0.008}Ti_{0.004})O_2$$

We claim as our invention:

1. A process for preparing a crystalline stannosilicate molecular sieve having a microporous three dimensional structure containing at least $SiO_2$ tetrahedral and $SnO_2$ tetrahedral units, a crystallographically regular pore system, and an empirical formula on a calcined and anhydrous basis of:

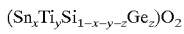

where "x" is the mole fraction of tin and varies from about 0.001 to about 0.1, "y" is the mole fraction of titanium and varies from zero to about 0.1 and "z" is the mole fraction of germanium and varies from zero to less than about 0.08 and characterized in that the composition has the characteristic x-ray diffraction pattern of zeolite beta, the process comprising forming a reaction mixture containing reactive sources of silicon, tin, an organic templating agent (R), optionally titanium, optionally germanium, fluoride, and optionally hydrogen peroxide, reacting said mixture at a pH of about 6 to about 12 and at a temperature and a time sufficient to form the crystalline molecular sieve, the mixture having a composition expressed in terms of mole ratios of

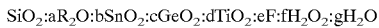

where "a" has a value from about 0.06 to about 0.5, "b" has a value from about 0.001 to about 0.1, "c" has a value from zero to about 0.08, "d" has a value from 0 to about 0.1, "e" has a value from about 0.1 to about 2, "f" has a value from zero to about 0.5 and "g" has a value from about 4 to about 50.

2. The process of claim 1 where the temperature varies from about 90° C. to about 200° C. and the time varies from about 2 to about 50 days.

3. The process of claim 1 where the pH is in the range of about 7.5 to about 9.5.

4. The process of claim 1 where the R source is selected from the group consisting of tetra-alkylammonium ions, aza-polycyclic compounds, dialkyldibenzylammonium ions and bis-piperidinium compounds.

5. The process of claim 4 where the R source is selected from the group consisting of tetraethylammonium ions, 1,4-diazabicyclo-2,2,2 octane, dimethyldibenzyl ammonium ions and 4,4'trimethylene bis (N-benzyl N-methyl piperidinium) ions.

6. The process of claim 1 where the tin source is selected from the group consisting of tin halide, tin alkoxides and tin oxide.

7. The process of claim 6 where the tin halide is tin tetrachloride.

8. The process of claim 6 where the tin alkoxide is selected from the group consisting of tin butoxide, tin ethoxide and tin propoxide.

9. The process of claim 1 where the titanium source is selected from the group consisting of titanium alkoxides and titanium halides.

10. The process of claim 9 where the titanium alkoxide is selected from the group consisting of titanium tetraethoxide, titanium isopropoxide and titanium tetrabutoxide.

11. The process of claim 1 where the silicon source is selected from the group consisting of colloidal silica, amorphous silica, fumed silica, silica gel and tetraalkylorthosilicate.

12. The process of claim 11 where the silicon source is selected from the group consisting of amorphous silica and tetraethylorthosilicate.

13. The process of claim 1 where the germanium source is selected from the group consisting of germanium halides, germanium alkoxides and germanium oxide.

14. The process of claim 1 further characterized in that the crystalline molecular sieve is calcined at a temperature of about 300° C. to about 1000° C. for a time sufficient to remove substantially all of the fluoride and organic templating agent.

* * * * *